United States Patent

[11] 3,599,484

| [72] | Inventors | Donald R. Stewart;<br>Howard B. Dutro, both of Denver, Colo. |
| --- | --- | --- |
| [21] | Appl. No. | 784,850 |
| [22] | Filed | Dec. 18, 1968 |
| [45] | Patented | Aug. 17, 1971 |
| [73] | Assignee | Teledyne Industries, Inc.<br>Los Angeles, Calif. |

[54] SHIELDED LOAD CELL
4 Claims, 5 Drawing Figs.

[52] U.S. Cl. .................................................. 73/141 A,
73/398 AR
[51] Int. Cl. ...................................................... G01e 5/12
[50] Field of Search .......................................... 324/126;
73/431, 141, 35, 11, 12, 141 A; 58/88 C; 206/46
FC; 260/2.5

[56] References Cited
UNITED STATES PATENTS

| 3,434,336 | 3/1969 | Harr | 73/35 |
| --- | --- | --- | --- |
| 3,415,364 | 12/1968 | Schneider | 206/46 |
| 3,346,221 | 10/1967 | Farmer | 206/46 |
| 3,033,358 | 5/1962 | Mantell | 206/46 |
| 2,951,371 | 9/1960 | Reid | 73/431 |
| 2,712,113 | 6/1955 | Triplett | 324/156 |
| 2,488,347 | 11/1949 | Thurston | 201/63 |
| 2,908,061 | 10/1959 | Adams | 24/279 |
| 2,934,805 | 5/1960 | Zartler | 24/279 |
| 2,938,690 | 5/1960 | Castle | 248/27 |
| 3,353,409 | 11/1967 | Gelbach | 73/398 |
| 3,427,875 | 2/1969 | Saxl | 73/141 |

Primary Examiner—Richard C. Queisser
Assistant Examiner—John Whalen
Attorney—Van Valkenburgh and Lowe ABSTRACT: A cylindrical load cell of the type which is adapted to support large compressive loads and which has a sensitive, calibrated transducer means within the cell to indicate the magnitude of such loads. In the improved construction, the load cell is shielded by a layer of closed-pore foam to prevent percussive shocks as from blasting, from damaging the transducer means or altering the calibration of this transducer means. The closed-pore foam shield is effective to attenuate the force of a shock striking the cell with the cell in the air or with the cell being submerged in water.

PATENTED AUG 17 1971
3,599,484
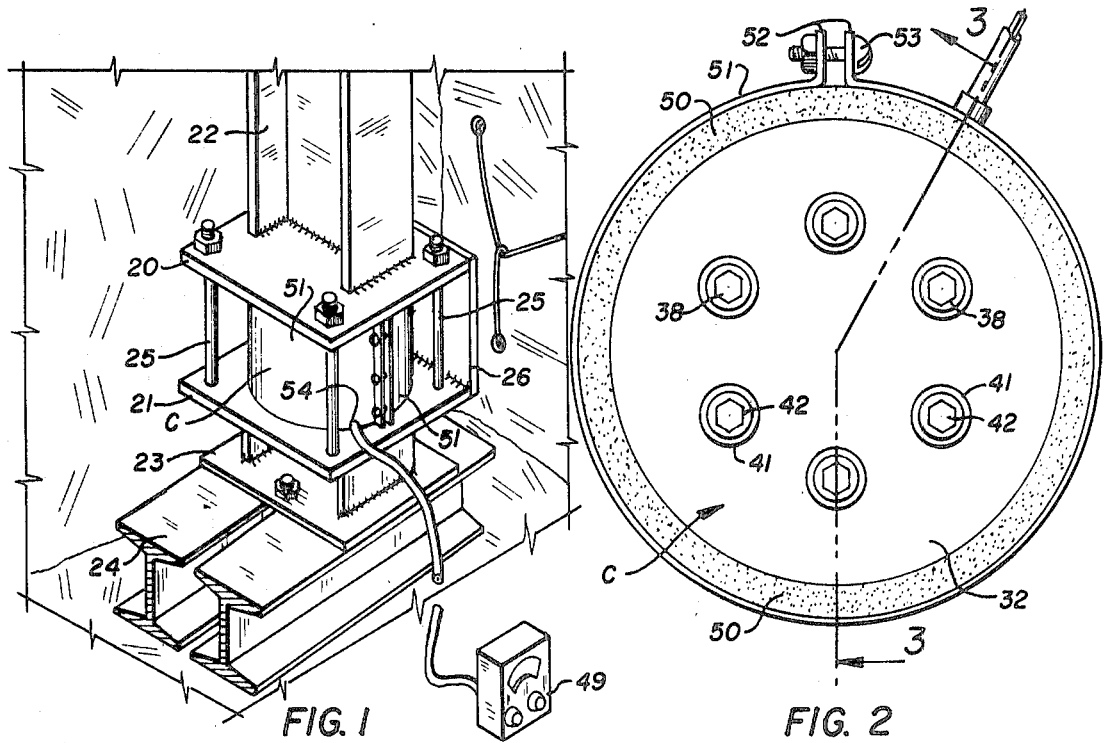
FIG. 1
FIG. 2
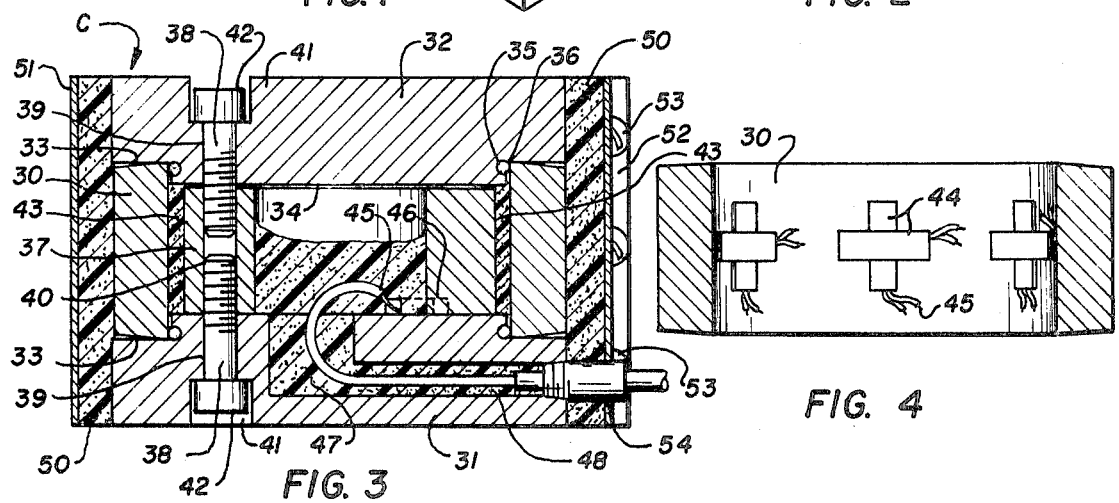
FIG. 3
FIG. 4
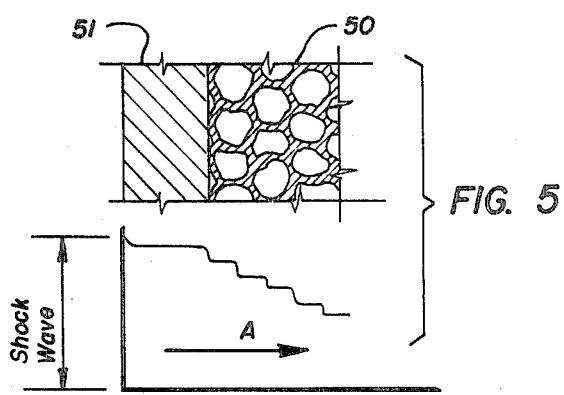
FIG. 5
INVENTORS.
Donald R. Stewart
BY Howard B. Dutro
Van Valkenburgh & Lowe
ATTORNEYS

SHIELDED LOAD CELL

This invention relates to load indicating devices and more particularly to load cells of the type which support and measure the loads upon support structures. The invention is concerned with the use of load cells for steel columns and struts which are used in connection with underground excavation to hold the roof and side wall formations and overburden in place during excavation operations, and especially where the columns and struts are located adjacent to a wall or face which is being blasted.

In excavation work, it is desirable to seat such columns and struts upon load cells to record the loading and pressure upon these members. The information thus obtained is often essential for subsequent engineering design purposes and also, the load cells will provide advance warning should earth movements be occurring which could not otherwise be detected, but which could eventually bring about an excessive loading and ultimate collapse of the steel columns.

The load cells used for such purposes are formed as short, rugged cylinders and the improved type herein disclosed consists of a short, thick tube closed at each end by a cap. These cells will vary in diameter depending upon the load which they are designed to sustain, for example, an 8-inch diameter load cell of the tube-cap type can support a load exceeding 600,000.

The magnitude of the compressive load upon such a load cell is determined by measurement of the elastic deformation of the cell itself by very sensitive strain gages mounted upon or within the cell. Such stain gages are used to measure the flexure of the cell, preferably in the direction of the compressive force parallel to the axis of the cell, and also in a direction transversely to the axis of the cell. When using the tube-cap type of load cell, one desirable arrangement provides for twelve strain gages mounted as crossed pairs at 60° spacings about the inner wall of the tubular shell, as a sextette of pairs.

The strain gages may be of various types and they are ordinarily electrical devices which measure very small movements through changes of resistance, inductance or capacitance in an electrical circuit having leads connecting with the gage and extending to a readout device at any suitable remote location. One popular type of strain gage consists of a rectangular tab carrying a fine wire at its contact surface which is looped to form a series of spaced, parallel reaches along the tab. The contact surface of the tab is securely cemented to the inner wall of the tubular shell and the wires will lengthen or shorten in an elastic manner responsive to the elastic movements of the cell. The changes of resistance to the wire responsive to such movements is measured by a delicate bridge-type circuit at the readout instrument. When strain gages of this type, or of any other type are thus mounted within a load cell, the cell can be calibrated in a testing machine and thereafter, the calibration data can be used to accurately determine the magnitude of loads and the changes of loading on a column supported by the cell.

A load cell may appear to be a heavy, rugged unit capable of withstanding all sorts of abuse, yet it is actually a comparatively delicate instrument. For example, the calibration of the load cell can be altered if the cell is mishandled or abused, and especially if the cell is subjected to a severe transverse shock. For example, such a shock could occur if the cell were dropped onto a solid object or struck with a sledge or the like. Such a shock may cause plastic yielding of the cell wall and sometimes will loosen or crack a small portion of the cement bonding a strain gage to the inner wall of the shell. Thereafter, the calibration of the load cell may be completely changed even though the gage still responds to indicate a load on the cell. It is thus essential that load cells be handled carefully.

When a load cell supports a column or strut adjacent to an excavation face where blasting is under way, the cell is subjected to blasting shocks which are usually very severe. The cell can be protected from impact from flying rocks, but it cannot be protected from a shock wave resulting from a blast without providing an elaborate enclosure for it. Moreover, in mining and excavation operations, a considerable amount of water may be present and sufficient to submerge the load cells supporting the columns, and the underwater shock waves from blasting are extremely severe. In the construction of the Elk Mountain Railroad Tunnel, in Montana, the load cells supporting the bracing columns were frequently submerged and the shock waves from the adjacent blasting activities affected the calibrations of the cells to the point where the information obtained from these cells was considered unreliable. Subsequently, it was found that the blasting shock waves in air, although not nearly as forceful as shock waves under water, were also disrupting the calibrated frequently if reliable results were desired.

It follows that there is a real and definite need for a simple and practical mode for shielding a load cell against blast shocks and the present invention was conceived and developed with such a need in view. The invention comprises, in essence, a load cell having its cylindrical walls ensheathed within a layer of resilient, closed pore foam which, in turn, is embraced by and held within a rigid sleeve. It was discovered that a comparatively thin layer of resilient, closed-pore foam will attenuate a shock wave passing through it to one-fifth to one-tenth of its initial force and severity, and to the point where the strain gage mountings within the load cell will not be changed.

Accordingly, an object of the invention is to provide a novel and improved shielded load cell which can withstand shock waves as from blasting without the likelihood of being damaged or having the calibration of the cell altered.

Another object of the invention is to provide a novel and improved shielded load cell which may be used with assurance and without fear of having its calibration altered, even when the cell is submerged under water and nearby blasting operations are under way.

Another object of the invention is to provide a novel and improved shielding for a load cell which does not significantly increase the cell in size or in weight and which permits the cell to be used in the same manner as a conventional unshielded load cell without alternations or modifications to the bearing plates and other supports whereon the cell is mounted.

Other objects of the invention are to provide a novel and improved shielded load cell, having a simple and effective arrangement of shielding components about the cell, which is a neat appearing, rugged, reliable structure and which is not significantly more expensive than a conventional unshielded load cell.

With the foregoing and other objects in view, all of which more fully hereinafter appear, my invention comprises certain constructions, combinations and arrangement of parts and elements as hereinafter described, defined in the appended claims and illustrated in the accompanying drawing, in which:

FIG. 1 is a perspective view of a column mounted adjacent to an excavation face prepared for a blasting operation, showing the column mounted upon an improved load cell which, in turn, is mounted upon a base, and indicating diagrammatically a readout meter connected to the load cell at a remote location, this figure being indicative of a typical environment wherein a load cell is used.

FIG. 2 is a plan view of the improved load cell per se.

FIG. 3 is a sectional elevation view of the load cell as taken from the indicated line 3–3 at FIG. 2.

FIG. 4 is a sectional elevational view of the load tube of the cell, showing pairs of strain gages mounted on the inner wall thereof.

FIG. 5 is a diagrammatic large-scale view of a small portion of the shock attenuating closed-pore layer, a fragment of the cover sleeve therefor, and a chart to indicate the manner in which a shock wave is attenuated as it moves through the layer of foam.

Referring more particularly to the drawing, FIG. 1 shows a typical installation of a support column wherein an improved load cell C, a short cylindrical member, is mounted between a pair of substantially square bearing plates, upper and lower 20 and 21, which are spaced apart in a cutout portion of the column 22 located near the bottom of the column. The base of the column is mounted upon a base plate 23 which, in turn, is carried upon footing beams 24. The two bearing plates are the same size and each includes a hole near each corner to receive a bolt 25 connecting one plate to the other to secure the load cell therebetween. The bolts are selected in such a manner as to act with the load cell to provide a continuity of loading on the column. To complete this assembly, one or more shield plates 26 is welded to the lower bearing plate 20 to upstand from an edge thereof to protect the load cell from flying rock whenever nearby blasting will occur, such as at the location illustrated in FIG. 1.

The upper and lower bearing plates 20 and 21 are welded to the column 22 as illustrated. Thus, after it has served its purpose, the load cell may be removed from between the bearing plates and replaced with a dummy. To do so, the bolts 25 are loosened and the column 21 is raised a short distance as by jacks or in any other suitable manner not shown.

The construction of a typical load cell incorporating the present invention is illustrated at FIGS. 2, 3, and 4. The primary load indicating member is a short, thick-walled load tube 30 which deflects elastically under a load. The lower and upper end of this tube is closed by comparatively thick, disc-shaped caps 31 and 32, and the caps and load tube therebetween combine to provide the cylindrical outer form of the cell. Each cap, 31 and 32, include an inset or rabbeted annular shelf 33 against which an end of the tube 30 seats with the central stub 34 of the cap projecting a short distance into the tube 30. The diameter of each stub 34 is slightly less than the inside diameter of the tube 30 and an annular groove 35 is located at the base of the stub to receive an O-ring 36 which fits in the groove 35 and against the inner surface of the tube 30 to hold the stub centered in the tube, to effect a seal, and to aid in relieving lateral shocks which might otherwise be transmitted between the tube and a cap.

A short, thick-walled tubular connector 37 loosely fits within the tube 30 with each end being adjacent to the stub face 34 of a cap. The connector 37 is held in an axially centered position with respect to the tube 30 by a circular array of belts 38 which extend through holes 39 in each cap, 31 and 32, and into tapped holes 40 extending through each end of the connector 35. The holes 39 in each cap are countersunk at their outer faces as at 41 to receive the heads 42 of the bolts 38 so that the outward surfaces of the caps will flatly rest against the bearing plates 20 and 21, hereinbefore described.

The annular space 43 between the inner wall of the load tube 30 and the connector 37 is preferably at least one-fourth inch and is sufficient to provide for the mounting of strain gages 44 to the inner wall of the load tube 30. Each gage 44 is formed as a flat, rectangular tab having wire leads 45 extending from one end thereof. These gages are adapted to be cemented upon the inner wall of the tube 30 by using a selected resin adhesive which will become quite hard when it sets so that the small wires within the gage will deflect with the deflection of the tube 30.

A number of gages may be used in a single unit and one preferred arrangement which accounts for any eccentricity in loading is to provide six pairs of gages, each in a crossed, overlapped pattern as illustrated, at 60° spacings about the load tube. The leads 45 of these gages are interconnected in a correlating manner and a common lead from each side of the gages extends through a passageway 46 in the wall of the connector 37 and to the center of the gage where they join with wires in a shielded conduit 47 which extends through a lateral passageway 48 in the lower cap 31 and to a readout instrument 49 as indicated at FIG. 1. After the gages are mounted in place and the wire connections made as described, the annular space 43 is filled or potted with a material such as polyurethane and also the center of the connector 37 is partially filled with a similar potting material as illustrated at FIG. 3.

The load cell C, which is representative of several types presently in use, is calibrated in a standard testing machine by observing readings of the instrument 49 at selected loads. Such test loading is held within the proportional limit of the material comprising the load tube 30, and which establishes the capacity of the cell. The simple calibration curve thus obtained from such test data provides an accurate means for subsequent determination of the load on a column supported by the gage.

It would seem that little could go wrong with a rugged load cell and a simple strain gage load indicating system of the type described. However, as heretofore mentioned, it has been observed that the zero point of the calibration curve of a cell such as described, and of other cells of conventional constriction, is altered whenever the cell is subjected to shock. Apparently, an intense shock may cause a slight plastic deformation in the load tube 30. Such deformation will cause a permanent chaNge of the strain gage wire lengths. Sometimes, in addition, there is a weakening of the adhesive bond of one or more of the strain gages 42 on the inner wall of the load tube 30. Such shocks can occur whenever the cells are located adjacent to blasting operations such as indicated at FIG. 1. The shield plate 26 can protect the cell from flying rock, but it cannot protect it from the actual shock waves of the blast. This is especially so where the load cell is submerged, because the shock wave from an underwater blast is extremely severe and is directionally confined within the body of water.

To insulate the load cell C from laterally directed shock waves without using an elaborate cover or a special mounting structure, or without changing the basic structure of the cell, it was discovered that the cylindrical wall of the cell could be ensheathed in a sleeve 50 of a resilient, closed-pore foam, held in place with a thin-wall cylindrical clamp 51. It was found that with a foam having pores in the approximate range of one-hundredth to one-sixteenth inch in diameter, the thickness of the layer of foam sleeve to provide significant attenuation of a shock, could vary from a minimum of one-fourth inch to a maximum of 2 inches and a thickness of at least 1 inch is preferable for a cell having a diameter in the range of 8 inches. When a foam layer is thicker than 2 inches, the additional attenuation effect was found to be slight and the bulk about the cell became objectionable.

The foam sleeve 50 extends completely about the cylindrical surface of the cell C to the full height thereof, to cover the tube 30 and the sides of the caps 31 and 32. The clamp 51, holding this sleeve in place, formed a cylindrical member sized to embrace the sleeve and its width is slightly less than the height of the load cell. It is manufactured in any suitable manner such as a flat or rolled sheet adapted to wrap about the sleeve 50. Flanges 52 are provided at each end of this clamp 51 to oppose each other when embracing the sleeve 50. The flanges include spaced, opposing holes through which bolts 53 extend to permit the clamp 51 to be tightened upon the sleeve 50 to a snug fit. To complete the clamp, a hole 54 is provided near the bottom edge thei. of through which the conduit 45 is extended.

The closed pore foam sleeve 50 may be of a natural rubber or of synthetic resin or rubber. Such would include foams manufactured from polyurethane, polyvinyl chloride, cell. lose acetate, epoxies, silicones and synthetic rubbers. However, polyurethane foams, available in a wide range of textures from very soft and resilient to hard and abrasive, were found to be a preferred type of foam material, because the ingredients from which it is formed can be selected and compounded to produce a comparatively tough and resilient closed-pore material with any suitable pore size, all in accordance with procedures well known to the technician in the field. Moreover, with polyurethane, the foam can be provided as a flat sheet which can be wrapped about the load cell, or it can be provided as a foamed-in-place product encapsulating the wall of the cell.

FIG. 5 illustrates diagrammatically the manner in which it is believed that the closed-pore sleeve 50 attenuates a shock wave striking the outer surface of the clamp 51. A small amount of attenuation occurs at each interface between different materials and a wave striking the clamp is reduced in force only slightly by the clamp itself. However, as the wave progresses through the foam, as in the direction of the indicated arrow A, a slight attenuation occurs at each pore to reduce its intensity. Experiments indicate that with a sleeve 50 having a thickness of one inch, a shock wave will be attenuated to as little as one-fifth to one-tenth of its original intensity and to a point where the shock effect against the tube 30 of the load cell is not sufficient to affect the strain gage calibrations. When the improved shielded load cells were used at locations where they were submerged and subjected to underwater blasting shocks, it was found that the calibrations of the strain gages were not affected and that the cells apparently suffered no damage whatsoever from the severe underwater shocks to which they were subjected.

We have now described our invention in considerable detail; however, it is obvious that others skilled in the art can devise and build alternate and equivalent constructions which are within the spirit and scope of the invention as defined in the appended claims.

We claim:

1. A shielded load cell formed as a comparatively—short, cylindrical unit, adapted to receive an axially directed compressive load and to withstand the effect of explosive shock waves against the side of the cell, and comprising:
    a. a short, thick-walled tube;
    b. a flat end cap, having a diameter substantially the same as the outside diameter of the tube, at each end of the tube, and with each end cap having a cylindrical stub projecting into the end of the tube;
    c. a strain gage means within the tube to respond to elastic deformation of the tube when the tube is being compressed by a load applied against the end caps and means to measure the response to the strain gage means to indicate the magnitude of the load;
    d. a layer of closed pore foam embracing the cylindrical walls of the tube and end caps;
    e. a cylindrical clamp snugly embracing the layer of foam to hold the foam against the wall of the cell and passing through the cell; and
    f. a resilient O-ring between the inner wall of the tube and each end cap stub to prevent the radial component of a shock wave imparted to an end cap from passing from the end cap and to the cell.

2. In the combination defined in claim 1, wherein said foam layer has a pore size in the approximate range of between one-hundredth inch and one-sixteenth inch and wherein the foam layer has a thickness exceeding approximately one-fourth inch.

3. In the combination defined in claim 1, wherein said foam layer has the general characteristics of resilient polyurethane having a pore size in the approximate range of between one-hundredth inch and one-sixteenth inch and wherein the thickness of the layer exceeds a minimum of approximately one-fourth inch and does not exceed a maximum of approximately 2-inches.

4. In the combination defined in claim 1, wherein said clamp is formed as a tubular member having a width substantially the height of the load cell and a length slightly less than the circumference of the foam layer about the cell, a transversely disposed flange at each end thereof adapted to lie adjacent to a flange at the opposite end when wrapped about the cell, and means on the flanges adapted to pull them together to tighten the clamp about the foam layer.

UNITED STATES PATENT OFFICE
CERTIFICATE OF CORRECTION

Patent No. 3,599,484                                August 17, 197

DONALD R. STEWART
HOWARD B. DUTRO

It is certified that error appears in the above identi fied patent and that said Letters Patent are hereby corrected as shown below:

Column 1, line 27, after "600,000" delete the "." and add -- pounds.-- . Column 2, line 14, after "disrupting the" add -- calibrations of load cells to the point where the load cells had to be --. Column 4, line 14, "constric-" should re -- construc- --; line 18, "chaNge" should be -- change --. Claim 1, Column 6, line 7, after "cell" add -- , whereby to attenuate a shock wave striking the wall of the cell --.

Signed and sealed this 25th day of January 1972.

(SEAL)
Attest:

EDWARD M. FLETCHER, JR.                ROBERT GOTTSCHALK
Attesting Officer                        Commissioner of Patents